(No Model.)
C. HOWES.
Excelsior Machine.
No. 234,475. Patented Nov. 16, 1880.
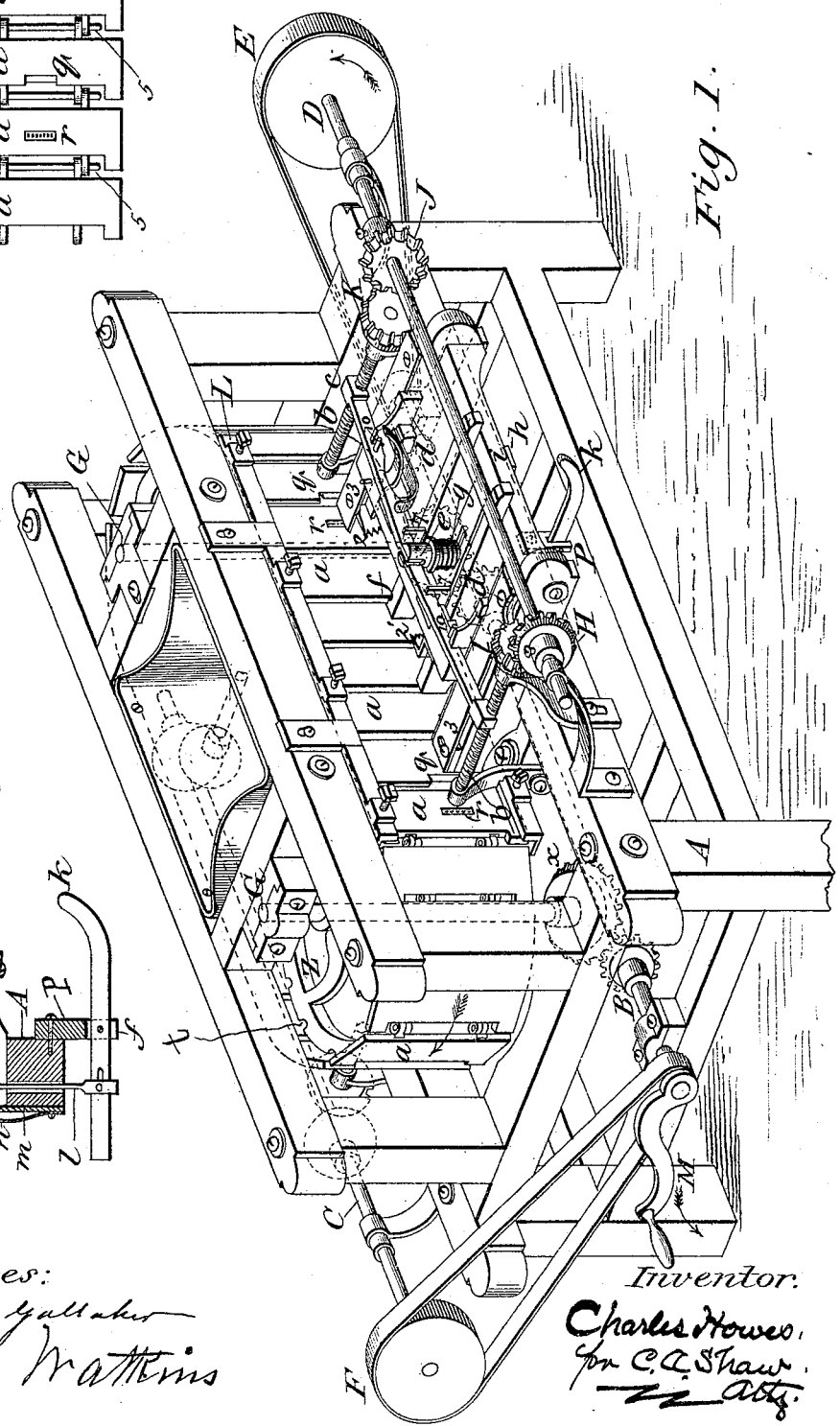

UNITED STATES PATENT OFFICE.

CHARLES HOWES, OF HUDSON, ASSIGNOR TO TIMOTHY B. PATCH, OF MARLBOROUGH, MASSACHUSETTS.

EXCELSIOR-MACHINE.

SPECIFICATION forming part of Letters Patent No. 234,475, dated November 16, 1880.

Application filed May 27, 1880. (No model.)

*To all whom it may concern:*

Be it known that I, CHARLES HOWES, of Hudson, in the county of Middlesex, State of Massachusetts, have invented a certain new and useful Improvement in Excelsior-Machines, of which the following is a description sufficiently full, clear, and exact to enable any person skilled in the art or science to which my invention appertains to make and use the same, reference being had to the accompanying drawings, forming a part of this specification, in which—

Figure 1 is an isometrical perspective view; Fig. 2, a vertical transverse section of the feed mechanism; and Fig. 3, a view of a section of the band, showing the arrangement of the spurs and plane.

Like letters and figures of reference indicate corresponding parts in the different figures of the drawings.

My invention relates to that class of excelsior-machines which are provided with an automatic feed; and it consists in a novel construction and arrangement of parts, as hereinafter fully set forth and claimed, by which a more effective device of this character is produced than is now in ordinary use.

In the drawings, A represents the frame, B the main driving-shaft, and C D the counter-shafts.

Journaled vertically in the frame are two shafts, G G, each carrying a wheel or skeleton-pulley, $z$, and on the lower ends of these respective shafts are bevel-gears $x$, which intersect with corresponding bevel-gears on the main shaft B.

An endless belt or band composed of a series of vertically-arranged lags or plates, $a\ a\ a$, jointed together at their upper and lower ends, as shown in Fig. 3, is fitted to the pulleys $z$, the faces of the pulleys being properly notched or corrugated, as shown at $t$, to receive the pintle-wires or joint-rods 5 5, and thus prevent the band from slipping.

Projecting from the outer face of one of the lags $a$ there are a series of splitting knives or spurs, $r$, the adjoining lag to the one containing the spurs being provided with a cutter or plane, $q$. These parts are similar to the spurs and plane or cutter used in ordinary excelsior-machines, and may be secured to and adjusted in the lags by any proper appliances for that purpose, the band being furnished at regular intervals with spurs and knives throughout its entire length, arranged in pairs or in respect to each other as shown in Fig. 3.

Two exteriorly-threaded shafts or screw-rods, $b\ b$, are journaled, by means of supporting-brackets, (but partially shown,) horizontally in the frame A, the outer ends of the rods being provided with bevel-gears, which intersect with corresponding gears on the counter-shaft D; and pivoted by their inner ends to the movable stud $e$ are two arms or levers, $c\ c$, which are also pivoted at 10 to the bar $f$. These levers, at their outer ends, are grooved transversely on their under sides, the grooves being screw-threaded to correspond with the screw-threading on the rods $b\ b$.

The lower end of the stud $e$ is secured to the plate $h$, but works freely in a slot, 6, in said plate, the outer end of the plate being pivoted or jointed loosely to the bar $i$, forming a part of the frame; and around the stud $e$ there is a coiled spring, $g$, the lower end of which rests on the upper side of the plate $h$, and the upper end pressing against the under side of the projection 4, forming a part of the bar $f$, in which projection the stud $e$ is fitted to slide vertically.

A lever, $k$, is pivoted in the bracket or support P, attached to the frame A, said lever being provided with a push-rod, $l$, near its inner end, which rod extends upwardly to the under side of the plate $h$. Secured to the inner side of the frame A there is also a vertical yielding plate or catch, $m$, provided with the spring $n$, which acts constantly to force the catch toward the front or outer side of the machine.

A pair of ordinary dogs or jaws, 2 2', for grasping and holding the block or blank to be converted into excelsior, are secured to the inner face of the bar $f$, the jaw 2' being rigid and the jaw 2 pivoted to swing laterally in opening to receive the block.

The bar $f$ carries the stud $e$ in the ring or projection 4, and is provided at either end with the shoes or plates $d$, fitted to move freely on the cross-bars 3 3 of the frame, thus forming ways on which the principal parts of the feed mechanism slide in feeding the blank to the plane $q$ or in receding therefrom. The bar is also provided with upwardly-projecting arms 7 7, to assist in retaining the levers $c\ c$ in a proper position.

The sliding parts of the feed mechanism consist of the horizontal bar $f$, shoes $d\ d$, stud $e$, spring $g$, levers $c\ c$, and jaws 2 2', and when the outer ends of the levers $c\ c$ are elevated to bring them out of contact with the screw-rods $b\ b$ the sliding parts may be moved freely back and forth on the ways 3 3.

In the use of my improvement the sliding portions of the feed mechanism are brought to the front of the machine or as far from the lags $a\ a$ as possible, and the blank or block to be cut inserted and secured in the jaws 2 2'. The inner or free end of the plate $h$ is then elevated by means of the lever $k$ and push-rod $l$, permitting it to catch upon and be supported by the bar $m$, as shown in Fig. 2, and bringing the outer ends in contact with the screw-shafts $b\ b$.

If, now, power is applied to the crank M on the main shaft B, turning it in the direction shown by the arrow, the pulley E, which is belted to the opposite end of said shaft, or to a pulley thereon, will revolve in the direction indicated by its arrow, and the shaft D, acting through the gears H I J K, will turn the screw shafts or rods $b\ b$ and cause the levers $c\ c$, and with them all the sliding portions of the feed mechanism, to move toward the lags $a\ a$, and thus feed the block to the spurs $r$ and plane $q$.

When the stud $e$ has advanced sufficiently to be brought into contact with the support or catch $m$, the action of the spring $n$ will be overcome and said bar pushed from under the end of the plate $h$. The spring $g$, acting expansively against the under side of the bar $f$ and on the upper side of the plate $h$, will now force the stud $e$ downwardly, depressing the inner ends and elevating the outer ends of the levers $c\ c$, thus disconnecting said levers from the screw-rods $b\ b$ and causing the forward movements of the feed to stop, when the sliding parts of the feed mechanism may be again moved to the front of the machine preparatory to receiving another block or blank and repeating the operation.

It will be understood that as the block is fed forward, as described, the endless band composed of the lags $a\ a$ is carried around the drums or wheels $z$ in the direction shown by the arrow thereon, bringing first the spurs or knives $r$ into contact with the face of the block or blank and scoring or slitting the same into strips of proper width for excelsior, the plane $q$ following the spurs and planing or cutting the strips from the face of the block in the usual manner.

My improved machine is provided with another feed mechanism driven by the shaft C; but as it is in every respect like the one shown in Figs. 1 and 2 a description of the same is deemed unnecessary.

The upper and lower ends of the lags $a\ a$ are fitted to run in suitable guides or ways L, and a flange or other proper means may be provided on the wheels or drums $z$, to prevent the endless band from slipping down or sagging.

It will be obvious that by mounting the spurs $r$ and plane $q$ in an endless band, as described, and employing two feed mechanisms, the machine may be run at great speed, and its capacity will be greatly increased.

It will also be obvious that the machine described is well adapted to the manufacture of wood-pulp for paper-stock, and also for cutting or sharpening pegs or grooving the peg-wood, by a slight change in the spurs and plane.

Having thus explained my improvement, what I claim is—

1. The combination, in an excelsior-machine, of the driving-shaft B, counter-shaft D, connecting-band and pulleys, vertical shafts G G, provided with sprocket-wheels $z$, bevel-gears $x$, endless band composed of hinged lags $a\ a$, carrying spurs $r$ and plane $q$, screw-rods $b\ b$ at right angles to counter-shaft, bevel-gears H I J K, levers $c\ c$, sliding bar $f$, spring-stud $e$, plate $h$, catch or support $n$, and block-holding jaws 2 2', substantially as described.

2. In the feed mechanism of an excelsior-machine substantially such as described, the screw-rods $b\ b$, levers $c\ c$, sliding bar $f$, spring-stud $e$, plate $h$, catch or support $n$, shaft D, and gears H I J K, combined and arranged to operate substantially as and for the purpose set forth.

3. The combination, in an excelsior-machine, of the slotted plate $h$, stud $e$, spring $g$, lever $k$, rod $l$, and catch $m$, substantially as described.

CHARLES HOWES.

Witnesses:
DANIEL W. STRATTON,
LUMAN W. FRANCIS.